Aug. 10, 1954 — A. W. HORTENSTINE — 2,685,816

GLASS THICKNESS GAUGING DEVICE

Filed June 20, 1951

INVENTOR.
ALBERT W. HORTENSTINE
BY
Zugelter & Zugelter
Attys.

Patented Aug. 10, 1954

2,685,816

UNITED STATES PATENT OFFICE 2,685,816

GLASS THICKNESS GAUGING DEVICE

Albert W. Hortenstine, Cincinnati, Ohio

Application June 20, 1951, Serial No. 232,635

1 Claim. (Cl. 88—14)

This invention relates to thickness gaging devices, and more particularly to a device for revealing by illumination, the thickness of transparent material such as glass, in the wall of a bottle, jar, or the like.

An object of this invention is to provide a relatively simple and inexpensive device that may be utilized for gaging by sight the thickness of the glass walls of bottles or the like as they pass from a forming machine over a conveyor to a lehr. By employing a device embodying the invention, the operator or inspector of the output of a bottle making machine may quickly detect variations in the thickness of glass walls or other sections of bottles as they come from the forming machine, thereby providing the operator of a bottle forming machine at any time with knowledge of the thickness of the glass bottles, so that necessary adjustments or changes may be made before a large number of bottles have been produced that would have to be rejected and scrapped.

In the bottle making industry the word "distribution" is used to designate or define the quality of the thickness of the glass in the bottles at various points. Good distribution means that the bottles have a uniform thickness within the limits of good practice. Poor distribution means that parts or sections of the bottles may be too thick, while other parts or sections may be too thin. In the production of bottles it is essential that undesirably thin glass walls be avoided. If the undesirable thinness in bottles is not detected prior to the annealing of the bottles and the packaging thereof, bottles which should have been rejected, are not discovered until after they have been shipped to a user. The user discovers the defective thin-walled bottles either in bottling lines or in storage after filling, by inspection or from excessive breakage occurring in the lines or in storage. When defective bottles are found by a user or customer the defective bottles are either returned to the manufacturer, or the bottle manufacturer will have a representative call on the bottle user or customer and inspect all the bottles. The defective bottles are culled out. When defective bottles are discovered in the hands of a customer or user, much loss of time and expense has occurred.

The device embodying the invention is so arranged and constructed that a whole cross section of a glass bottle may be made visible to the eye by placing the bottle in a beam of light emanating from the device. The thickness of the cross section is so revealed by the light beam, that the thickness may be gaged by sight.

The device embodying the invention does not measure the thickness of the bottle walls in terms of any unit of measure. One experienced in the use of the instrument is able to detect at a glance, whether the wall thickness revealed by the beam of light is satisfactory or too thin, for use in bottling operations.

An inspector stationed at the delivery line from a bottle making machine may make spot selections of bottles and place them in the beam of light of the device and quickly determine whether the glass walls are too thin at any point. Since the inspector may quickly obtain sufficient knowledge of the distribution of glass in the various bottles, he is able to give the operator the information he needs for the making of the adjustments in the bottle making machine required to effect the necessary distribution of glass in the bottles.

The above and other objects and advantages of the device embodying the invention, will be apparent from the following description, taken in conjunction with the accompanying drawings, in which.

Figure 1:
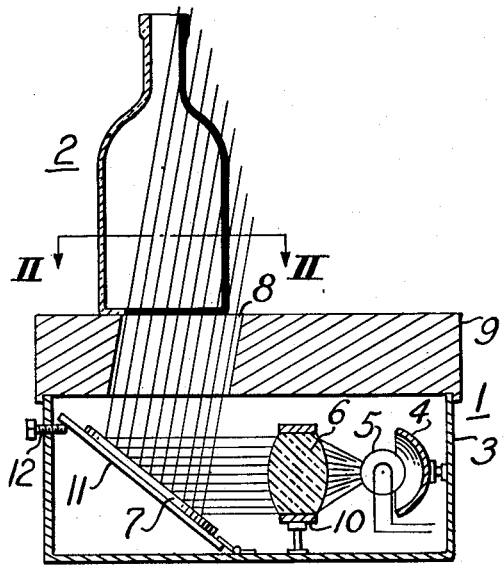
Figure 1 is a view in vertical section of a glass thickness gaging device arranged and constructed in accordance with an embodiment of the invention.

In Fig. 1 of the drawings a device 1 is shown by means of which the wall thickness of a glass object such as a bottle 2 may be gaged by the eye. The device comprises a housing 3 having therein a reflector 4, a light source 5 in front of the reflector, a condensing lens 6, and a flat-surfaced reflector 7. In the top of the housing a relatively narrow and deep slit 8 of substantially rhomboidal shape in vertical section, is formed in a housing cover member 9. The light from the light source passes through the condensing lens and strikes the reflector 7 such as a mirror. The mirror is disposed at such an angle that the light is reflected therefrom through the slit 8.

In a preferred form of the invention, the end walls of the slit 8 are inclined at an angle to the vertical. The angle of inclination of the end walls of the slit need not be the same as the angle at which the beams of light are reflected from the mirror through the slit. The width of the slit 8 relative to its depth and length is shown by Figs. 2 and 1.

Figure 2:
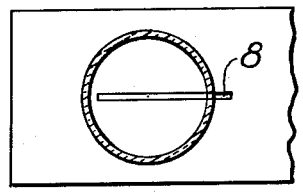
Fig. 2 is a view in section taken in line II—II of Fig. 1.

When it is desired to gage the thickness of the glass wall of an object such as a bottle or a jar, it is placed over the slit, as shown in Figs. 1 and 2. The narrow beam of light issuing from the slit passes through the bottom and the side wall of the bottle. In the form shown in Fig. 1, the beam of light extends from the bottom to the top or mouth of the bottle. The light striking the shaded area of the bottom and wall of the bottle is of such intensity that the thickness of the glass wall and the bottom are visible in substantially their true dimensions. An experienced operator who observes the thickness of the glass wall thus revealed, is able to determine whether or not the wall thickness is too thin or whether it is of acceptable thickness. If the bottle is too thin at any point the operator rejects it. By turning the bottle about its vertical axis while in position on the slit 8, the thickness of the glass wall of the entire bottle may be inspected readily and quickly.

The details of construction of the device shown in Fig. 1 are more or less schematic. As shown, the light source is diagrammatic. The condensing lens may be mounted in a holder or frame 10 secured to the bottom of the housing. The reflecting mirror 7 may be mounted on a hinged support member 11. The angle of the support member and the mirror may be adjusted by means of a thumb screw 12.

Figure 3:
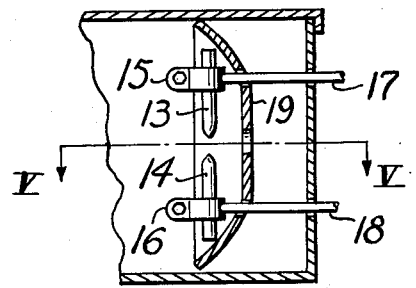
Fig. 3 is a partial view in vertical section of the device shown in Fig. 1, having a modified light source therefor.

The light source indicated in Fig. 1 represents an incandescent light of substantial wattage. Instead of an incandescent light source, an arc lamp such as shown in Fig. 3, may be employed. The arc lamp comprises arc electrodes 13 and 14 mounted in holders 15 and 16, respectively, to which the supply voltage conductors 17 and 18 are connected. A reflector 19 may be employed behind the arc electrodes. The reflecting surface of reflector 19 is preferably a modified parabolic surface, the surface being such as to project substantially parallel rays to the condensing lens and the mirror. When an arc lamp is employed and providing the curvature of the reflecting surface of reflector 19 is properly designed, the condensing lens 6 may be omitted.

Figure 6:
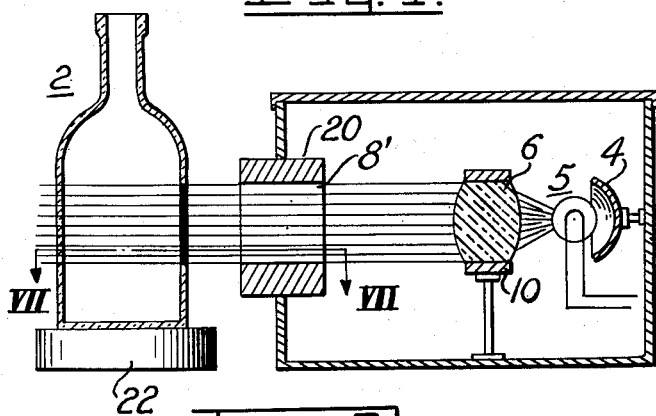
Fig. 6 is a view in vertical section of a still further modified form of device embodying the invention.

In Fig. 6 a modified form of the device is shown. In this device the reflecting mirror 7 and its support 11 are omitted and a member 20 containing a narrow, deep slit 8' is mounted in a side wall of the housing 3'. With the arrangement shown in Fig. 6, the light from the light source 5 passes through the condensing lens 6, and the slit 8 where it impinges on a glass object such as a bottle, placed adjacent the outside of the slit, as shown. In the arrangement shown in Fig. 6, the area illuminated most intensely is that represented by the shaded area. The illumination in the shaded area is such that the thickness of the glass wall is revealed to the eye in substantially its true dimension. As stated above, in connection with Fig. 1, an experienced observer can gage by sight the thickness of the glass wall in the shaded area with sufficient accuracy to determine whether the wall is too thin or whether it is of acceptable thickness. By rotating the bottle on its support 22, the thickness of the glass wall at any point within the area of the light beam may be inspected. By raising and lowering the bottle or by turning it on its side, other areas of the bottle may be inspected.

Figure 7:
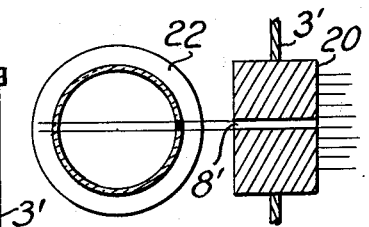
Fig. 7 is a view in section taken on line VII—VII of Fig. 6.

Figs. 6 and 7 illustrate the width of the slit 8' relative to its height and depth. Fig. 7 also reveals the width of the illuminated part of the bottle wall whose thickness is revealed by the beam of light. As in the form shown in Fig. 1, the light source of Fig. 6 may be replaced by an arc lamp of the type shown in Figs. 3 and 5.

Figure 4:
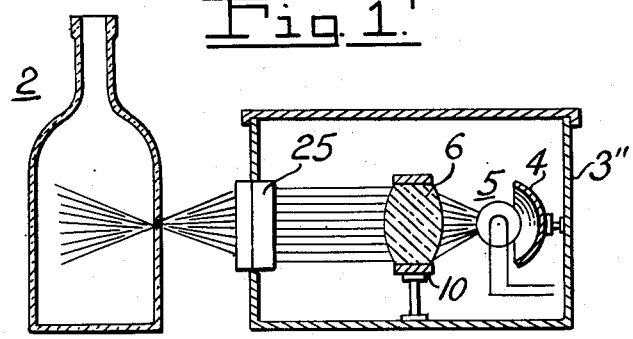
Fig. 4 is a view in vertical section of a modified form of the gaging device embodying the invention.

In Fig. 4 a still further modified form of the device is shown. That form includes a housing 3'' the light source 5, condensing lens 6, and a cylindrical lens 25 mounted in an opening in a side wall of the housing. A bottle or other hollow glass object to be gaged is placed adjacent the cylindrical lens 25 at such a point that the illuminated area in the wall of the bottle nearest the lens is located approximately at the focal point of the lens 25. With such an arrangement, the area of intense illumination in the glass wall is relatively small but reveals, however, the thickness of the wall at that particular point. By raising or lowering the bottle and rotating it, as required, the thickness of the wall at other points in the bottle may be visually gaged. Lens 25 may also be spherical.

Figure 5:
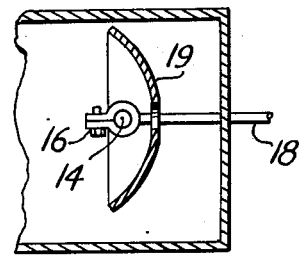
Fig. 5 is a view in section taken on line V—V of Fig. 3.

In place of the incandescent light source 5 shown in Fig. 4, an arc lamp of the type shown in Figs. 3 and 5, may be employed. As stated in connection with the description of Fig. 1, if the reflector 19 of the arc lamp is of the proper design, the condensing lens 6 may be omitted.

By means of the device illustrated and described, it will be apparent to those skilled in this art, that the thickness of the glass walls of bottles, jars, or the like, may be quickly and accurately gaged by sight without resorting to the use of devices having complicated and expensive optical systems.

Having thus described the invention, it will be apparent to those skilled in this art, that the illustrated forms of the invention may be modified without departing from either the spirit or the scope of the invention.

Therefore, what is claimed as new and desired to be secured by Letters Patent is:

A device for revealing the thickness of glass whereby the thickness may be gaged by the eye, comprising a housing having as a wall thereof, an opaque member, said member having therein a deep narrow slit, said slit being substantially rhomboidal in vertical section, the end walls of said slit being substantially parallel to each other and inclined at an angle to the vertical, a light source in the housing, and means for projecting rays of light from said source through said slit, whereby, when a glass object is placed adjacent said slit in the path of the light, the glass is so illuminated that the thickness thereof is revealed and can be gaged by sight.

References Cited in the file of this patent
UNITED STATES PATENTS

| Number | Name | Date |
| --- | --- | --- |
| 1,204,664 | Jackson | Nov. 14, 1916 |
| 1,521,648 | Pickett | Jan. 6, 1925 |
| 2,031,971 | Morrissey | Feb. 25, 1936 |
| 2,095,502 | Johnston | Oct. 12, 1937 |
| 2,250,084 | Schieck | July 22, 1941 |
| 2,267,544 | Wente | Dec. 23, 1941 |
| 2,335,686 | Mercur | Nov. 30, 1943 |
| 2,426,355 | Kellogg | Aug. 26, 1947 |
| 2,481,863 | Owens | Sept. 13, 1949 |